(12) United States Patent  (10) Patent No.: US 9,607,418 B1
Hemminger  (45) Date of Patent: Mar. 28, 2017

(54) METHOD OF TRANSACTION CARD RECOGNITION AND INTERACTION

(71) Applicant: Ceridian Stored Value Solutions, Inc., Brentwood, TN (US)

(72) Inventor: Christopher Hemminger, Brentwood, TN (US)

(73) Assignee: Comdata Inc., Brentwood, TN (US)

( * ) Notice: Subject to any disclaimer, the term of this patent is extended or adjusted under 35 U.S.C. 154(b) by 200 days.

(21) Appl. No.: 13/833,628

(22) Filed: Mar. 15, 2013

(51) Int. Cl.
*G09G 5/00* (2006.01)
*G06T 11/60* (2006.01)

(52) U.S. Cl.
CPC .................................... *G06T 11/60* (2013.01)

(58) Field of Classification Search
CPC ....................................................... G06T 11/60
USPC .................................................. 345/633, 629
See application file for complete search history.

(56) References Cited

U.S. PATENT DOCUMENTS

| | | | |
|---|---|---|---|
| 6,657,667 B1 | 12/2003 | Anderson | |
| 6,880,755 B2 | 4/2005 | Gorbet et al. | |
| 7,733,368 B2 | 6/2010 | Teo | |
| 8,628,008 B1* | 1/2014 | Lee et al. | 235/380 |
| 2002/0175924 A1 | 11/2002 | Yui et al. | |
| 2007/0246526 A1* | 10/2007 | Elgar et al. | 235/380 |
| 2008/0071559 A1* | 3/2008 | Arrasvuori | 705/1 |
| 2009/0112709 A1* | 4/2009 | Barhydt | G06Q 20/10 705/14.27 |
| 2011/0055049 A1* | 3/2011 | Harper | G06F 3/011 705/27.1 |
| 2012/0022924 A1 | 1/2012 | Runnels et al. | |
| 2012/0249741 A1* | 10/2012 | Maciocci | G06F 3/011 348/46 |
| 2014/0076965 A1* | 3/2014 | Becorest | G06Q 20/342 235/380 |
| 2015/0026785 A1* | 1/2015 | Soon-Shiong | G06Q 30/0207 726/7 |

* cited by examiner

*Primary Examiner* — Ke Xiao
*Assistant Examiner* — Kim-Thanh T Tran
(74) *Attorney, Agent, or Firm* — Patterson Intellectual Property Law, P.C.; Edward D. Lanquist, Jr.; Gary L. Montle

(57) ABSTRACT

A system and method are provided for recognition and interaction with transaction cards. A computing device collects images of a card via an image sensor, and implements facial recognition techniques to identify the card. An augmented reality program module causes the device to display a virtual object overlaid with the underlying video images. Upon identifying a dynamic trigger action by a user with respect to the virtual object, the program module enables an exchange of data associated with a card account between the device and a remote server. The dynamic trigger action may involve user manipulation of the displayed object via a pointing device with respect to the display, or of a virtual position in space of the object as viewed through the display.

15 Claims, 3 Drawing Sheets

METHOD OF TRANSACTION CARD RECOGNITION AND INTERACTION

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

CROSS-REFERENCES TO RELATED APPLICATIONS

This application claims benefit of the following patent application(s) which is/are hereby incorporated by reference: None

BACKGROUND OF THE INVENTION

The present invention relates generally to recognition of and interaction with transaction cards, which include, without limitation, payment cards (e.g., debit, credit, stored value cards), loyalty cards, phone cards, transit cards (e.g., NYC MetroCard), identification cards (e.g., government, student, employee), etc. More particularly, the present invention relates to a system and method of recognizing transaction cards using image or facial recognition technology and implementing computer applications, including without limitation, augmented reality functionality, to facilitate user interaction with a transaction card. Examples of user interaction may include, without limitation, account information access; account, card, or user registration; card transactions (debit, credit, etc.); merchant access; personal identification; security clearance; and personalized messaging; electronic gaming; and other novelty applications, etc.

Traditionally, transaction card users had limited methods for using a transaction card. For example, they may swipe it through a magnetic stripe reader, read the number directly off of the card, scan a bar code, etc. Such actions would occur at a point-of-sale device (POS), over the phone, or in more recent years via a web site.

With the rapid development of technologies involving computer and mobile applications (e.g., phones, tablets, PDAs etc.) there are many new opportunities to augment and enhance the user experience with these computing devices (e.g., personal computer, mobile device, gaming system, etc.). One specific recent technology called Augmented Reality (AR) in one example involves using a device equipped with an image sensor (e.g., such as those found in cameras, scanners, copiers, etc.) to perceive the real world through a computing device; to interpret or manipulate images using the device's built-in computing power; and to render additional images, text, controls, and/or functionality on a display unit associated with the device, overlaying the "augmented" images onto the image perceived by the image sensor. Another recent technology called image or facial recognition technology involves using a computer application to identify and/or verifying a person or object in an image or video frame.

Prior art inventions have employed 2D code reading technology to read barcodes or other markers on the surface of transaction cards. However, because transaction cards have limited surface "real estate", the inclusion of markers on the surface of a transaction card distracts from the overall graphical design or otherwise limits a transaction card's usable surface area. For example, one such approach as is known in the art employs the use of 2D codes as a marker on tokens, and attempts to overcome the limitations associated therewith by incorporating graphic designs into the marker and/or making the marker part of the user experience. However, such an approach still requires the inclusion of a surface marker and therefore is limited in the same regard as any approach requiring a marker.

It would be desirable to implement a card recognition technology that generates an improved interactive experience for users of transaction cards but without the inherent limitations of the prior art. Any additional avenues of use that could be opened by new technology would greatly enhance the user experience and potentially drive new sales.

It would further be desirable to implement a card recognition technology that can be applied to any pre-existing image or transaction card design.

It would even further be desirable to implement a card recognition technology that provides the opportunity for unique user experiences using non-branded, personalized, and/or customized transaction cards.

BRIEF SUMMARY OF THE INVENTION

Using facial recognition technology, a software application according to embodiments of the present invention allows a user device such as a computing device to recognize specific card designs when viewed through an associated image sensor which can capture images (still and/or video). Further, using augmented reality technology, a software application according to embodiments of the present invention allows a user to superimpose virtual objects such as, e.g., 3D images, text, buttons, controls, etc., on an underlying image of a specific object or environment, including the transaction card as viewed through the display unit.

Program modules according to the present invention apply facial recognition or other computer vision (CV) algorithms to images to detect, identify and/or orient the transaction card in three-dimensional space. The transaction card can then be used to trigger a user application on the computing device. For example, upon identifying the transaction card, an application would be triggered permitting user interaction with the computing device, such as account information access; account, card, or user registration; card transactions; merchant access; personal identification; security clearance; and personalized messaging; electronic gaming; and other novelty applications. In another example, upon identifying the transaction card, an application would be triggered resulting in the overlay of a projection of an image or three-dimensional scene or model on a video stream captured by the computing device for presentation to the user. In an another example, upon identifying and orienting the transaction card in three-dimensional space, the orientation of the card can then used to overlay a projection of a two- or three-dimensional scene or model on the video stream for presentation to the user. The process of using computer vision to identify a transaction card and subsequently overlaying graphical projections (i.e., augmented reality) generates a combined visual presentation that may even be manipulated by a user to trigger further actions and/or generation of additional virtual objects.

In a particular embodiment, a facial recognition program module may be embodied in a computing device having or functionally linked to one or more image sensors and one or more display units. The module is effective to detect, identify and/or orient an image taken of the transaction card. The device collects images via the image sensor and electronically analyzes the images for visual patterns associated with the transaction card. Upon identifying the card, a user application displays on the display unit. The user application may contain dynamic triggers for the device user to interact with and if the device further identifies a dynamic trigger action by a user of the client computing device with respect to the virtual object, an exchange of data associated with the transaction card is enabled between the client device and a remote server.

In another particular embodiment, an augmented reality program module may be embodied in a computing device having or functionally linked to one or more image sensors and one or more display units. The module is effective to direct the performance of an augmented reality experience in association with a transaction card. The device collects images via the image sensor, and displays the collected images on the display unit, the collected images defining a first (actual) image layer. The device electronically analyzes the images for visual patterns associated with the transaction card, and upon identifying the card the device displays a virtual object on the display unit. The virtual object defines a second (augmented reality) image layer overlaid with respect to a portion of the first image layer. If the device further identifies a dynamic trigger action by a user of the client computing device with respect to the virtual object, an exchange of data associated with the transaction card is enabled between the client device and a remote server.

In another particular embodiment, both a facial recognition program module and an augmented reality program module may be embodied in a computing device having or functionally linked to one or more image sensors and one or more display units. The facial recognition program module is effective to detect, identify and/or orient an image taken of the transaction card. The augmented reality program module is effective to direct the performance of an augmented reality experience in association with a transaction card. The device collects images via the image sensor and electronically analyzes the images for visual patterns associated with the transaction card. The device may display the collected images on the display unit and/or display other images obtained by the device, the collected and/or other images defining a first (actual) image layer. Upon identifying the card the device displays a virtual object on the display unit. The virtual object defines a second (augmented reality) image layer overlaid with respect to a portion of the first image layer. If the device further identifies a dynamic trigger action by a user of the client computing device with respect to the virtual object, an exchange of data associated with the transaction card is enabled between the client device and a remote server.

In another aspect, the virtual object and second image layer can define multiple layers or sub-layers.

One aspect of the present invention is that the dynamic trigger action by the user may include user manipulation of a portion of a touch screen or other pointing means (e.g., mouse, track ball, stylus, motion capture, etc.) associated with the device, the user-manipulated portion of the pointing means relating to the displayed virtual object.

In another aspect, the virtual object may be generated to maintain a virtual position with respect to the display device, wherein the dynamic trigger action by the user comprises user manipulation of the virtual position in space of the virtual object as viewed through the display device.

In other aspects further associated with the present invention, the virtual object may be a two- or three-dimensional image associated generally with any one of a plurality of transaction cards, and may further represent a value associated with the transaction card.

In another aspect, the transaction card may include unique identifiers such as for example alphanumeric text, a bar code, an augmented reality tag or Quick Response code printed on a surface of the transaction card, or alternatively a radio frequency identification tag (RFID), chip, or other contactless component in the transaction card. The device may be configured to read or otherwise interact with the unique identifier and further obtain transaction card account data or other information associated with the identifier.

In another aspect, the device may collect images via additional image sensors or other sources of image files functionally linked to the device. For example, a second image sensor functionally linked to the device may face the user of the device such that images, actions, or motions of the user may be collected. The device may be configured to interpret or utilize the images, actions, or motions (e.g., motion capture/sensing) of the user in connection with a virtual object or dynamic trigger, or as an alternative to the other pointing means noted herein.

In yet another aspect, the software may include an interface module for generating a graphical user interface on the display unit, and thereby effective to enable an access or exchange of account information between the client device and a remote server via user manipulation of the user interface. As one example, the interface module may enable registration of an account associated with the transaction card via user manipulation of the user interface. As another example, the interface module may enable transaction card related transactions. More specifically, as another example, the interface module may enable transferring of funds between the transaction card account and a third party account. As yet another example, the interface module may enable accessing or purchasing goods or services. As another example, the interface module may enable identification of an entity associated with the transaction card. As another example, the interface module may enable communication between the device user and a third party. As another example, the interface module may enable electronic gaming or other novelty applications.

DETAILED DESCRIPTION OF THE INVENTION

Figure 1:
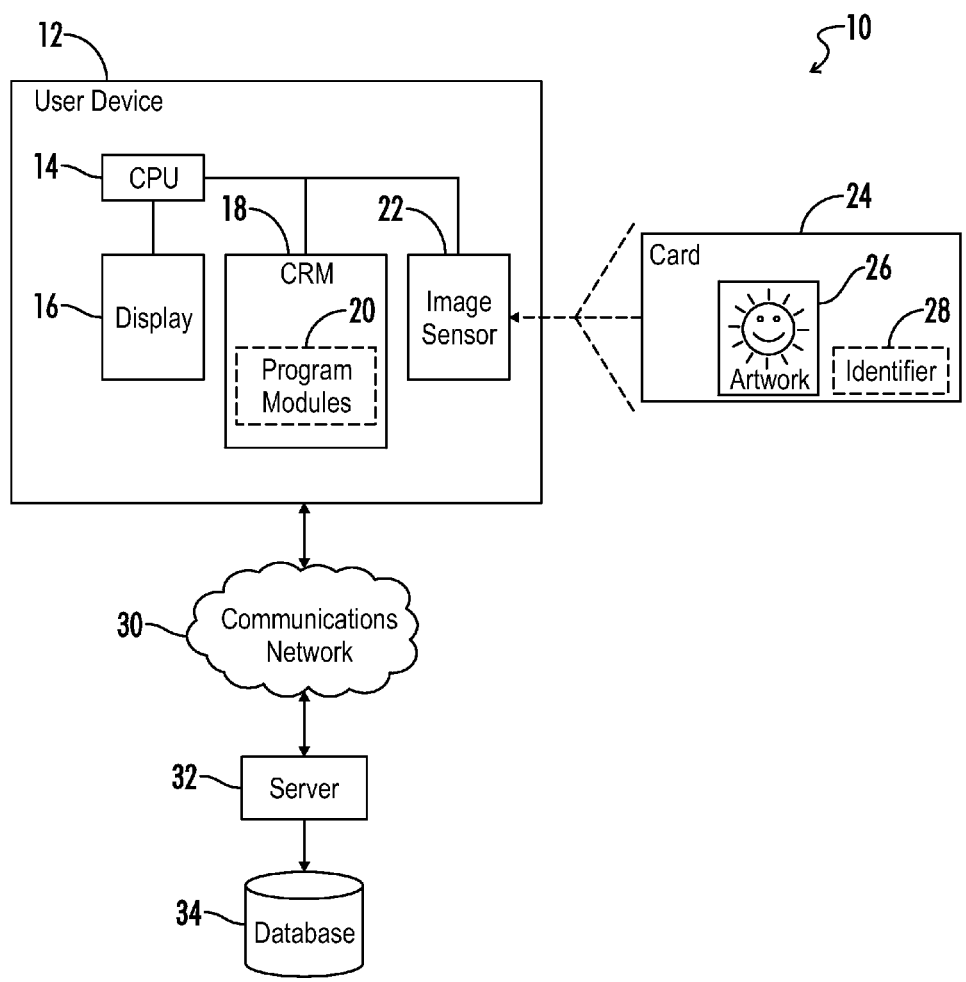
FIG. 1 is a block diagram representing an exemplary augmented reality system application according to an embodiment of the present invention.

Referring generally to FIGS. 1-4, various embodiments may now be described of a transaction card recognition and interaction system and method according to the present invention. Where the various figures may describe embodiments sharing various common elements and features with other embodiments, similar elements and features are given the same reference numerals and redundant description thereof may be omitted below.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in" and "on." The phrase "in one embodiment," as used herein does not necessarily refer to the same embodiment, although it may.

Terms such as "providing," "processing," "supplying," "determining," "calculating" or the like may refer at least to an action of a computer system, computer program, signal processor, logic or alternative analog or digital electronic device that may be transformative of signals represented as physical quantities, whether automatically or manually initiated.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The steps of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable medium known in the art. The term "computer-readable memory medium" as used herein may refer to any non-transitory medium alone or as one of a plurality of non-transitory media. An exemplary computer-readable medium can be coupled to the processor such that the processor can read information from, and write information to, the computer-readable medium. In the alternative, the computer-readable medium can be integral to the processor. It may further be understood that more than one type of computer-readable media may be used in combination to conduct processor-executable software/program instructions from a first computer-readable medium upon which the software initially resides to a processor for execution. The processor and the computer-readable medium can reside in an ASIC. The ASIC can reside in a user terminal. In the alternative, the processor and the computer-readable medium can reside as discrete components in a user terminal.

With respect to embodiments of the present invention, various illustrative components, blocks, modules, and steps may be described below generally in terms of their functionality. Whether such functionality is implemented as hardware or software may depend upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The term "user interface" as used herein may unless otherwise stated include any input-output module with respect to the hosted server including but not limited to web portals, such as individual web pages or those collectively defining a hosted website, mobile desktop applications, telephony interfaces such as interactive voice response (IVR), and the like. Such interfaces may in a broader sense include pop-ups or links to third party websites for the purpose of further accessing and/or integrating associated materials, data or program functions via the hosted system and in accordance with methods of the present invention.

The term "communications network" as used herein with respect to data communication between two or more parties or otherwise between communications network interfaces associated with two or more parties may refer to any one of, or a combination of any two or more of, telecommunications networks (whether wired, wireless, cellular or the like), a global network such as the Internet, local networks, network links, Internet Service Providers (ISP's), and intermediate communication interfaces.

The term "display unit" as used herein shall refer to those types of displays known in the art, including by way of example cathode ray tube (CRT), projection-type displays, liquid crystal display (LCD), plasma, light-emitting diode (LED)-type, and including both 2D and 3D equivalents.

Referring more particularly to FIG. 1, an exemplary embodiment of an augmented reality system 10 for interaction with transaction cards may include a user device 12 such as for example a mobile device, smart phone or desktop computer having or functionally linked to a processing unit 14, a display unit 16, an image sensor 22 and a computer-readable medium 18 upon which resides one or more facial recognition program modules 20 and/or augmented reality program modules 20. In certain embodiments, the program module 20 may be sufficient alone or in combination with other program modules resident to the device 12 to execute processes and algorithms as described herein. Alternatively, the program modules 20 may execute bidirectional communications, web-based or otherwise, with a remote server 32 or other remote computing device via a communications network 30. The server 32 may include or further be linked to executable program modules effective to direct the performance of additional algorithms or functions described herein, and may further be effective to collect, extract or otherwise obtain data from databases 34 or data repositories 34 for the purpose of executing the above-referenced algorithms or functions.

The system 10 typically further includes cards 24 having artwork 26 or equivalent visual patterns printed, embossed or otherwise provided in a visually apparent manner upon at least one surface. The artwork 26 may typically be representative of any one of a plurality of cards, but may alternatively be unique to a particular card or a particular user. The card may typically be a transaction card, which may include, without limitation, payment cards (e.g., debit, credit, stored value cards), loyalty cards, phone cards, transit cards (e.g., NYC MetroCard), identification cards (e.g., government, student, employee), etc., but the term "transaction card" as used herein may also apply without limitation to what may conventionally be regarded as non-transactional alternatives and also include various shapes, sizes, and designs other than traditional "card" designs, unless otherwise explicitly stated or logically required in the context of its usage.

In certain embodiments, as implied above, a pattern of artwork may be applied to the transaction card wherein the card may be uniquely identifiable and associated with a particular account or data file. Identifiable features may be extracted by detecting and contrasting distinct points within the artwork that are relatively invariant to image variations such as rotation, distance, perspective, etc., using computer vision techniques (e.g., facial recognition technology) that are known to those of skill in the art (e.g., OpenCV, FastCV, Matrox Imaging Library), examples of which may include but are in no way limited to the implementation of Gaussian filters, Hessian matrices, descriptor vector calculation and the like.

In certain embodiments, as implied above, users can interact with a user interface using a touch screen or other pointing devices, but additionally for certain embodiments via motion capture using motion capture techniques that are known to those of skill in the art (e.g., Organic Motion, Xsens, OptiTrack, MetaMotion).

A transaction card 24 may further include one or more unique identifiers 28 that may for example be alphanumeric text, a bar code, an augmented reality tag or Quick Response (QR) tag located on the surface of the card. Such unique identifiers can be read from the transaction card using software and hardware known in the art, including optical character recognition (OCR) and 2D code readers. The use of unique identifiers in addition to recognizing the card as described herein can permit the differentiation of cards or inclusion of additional information associated specifically with the unique identifier. However, in certain situations and depending on the use and/or placement of such unique identifiers on the transaction card, such an embodiment may not be desirable as the identifier would be a visible portion of the card, perhaps obstructing or otherwise interfering with the aesthetics of any artwork on the card. Therefore, in alternative embodiments it may be desirable to provide an embedded identifier such as for example an RFID tag, chip, or other contactless component, which may further include data that upon transmission to a computing device may be effective to support execution of certain application steps without the need for remote communications.

Figure 2:
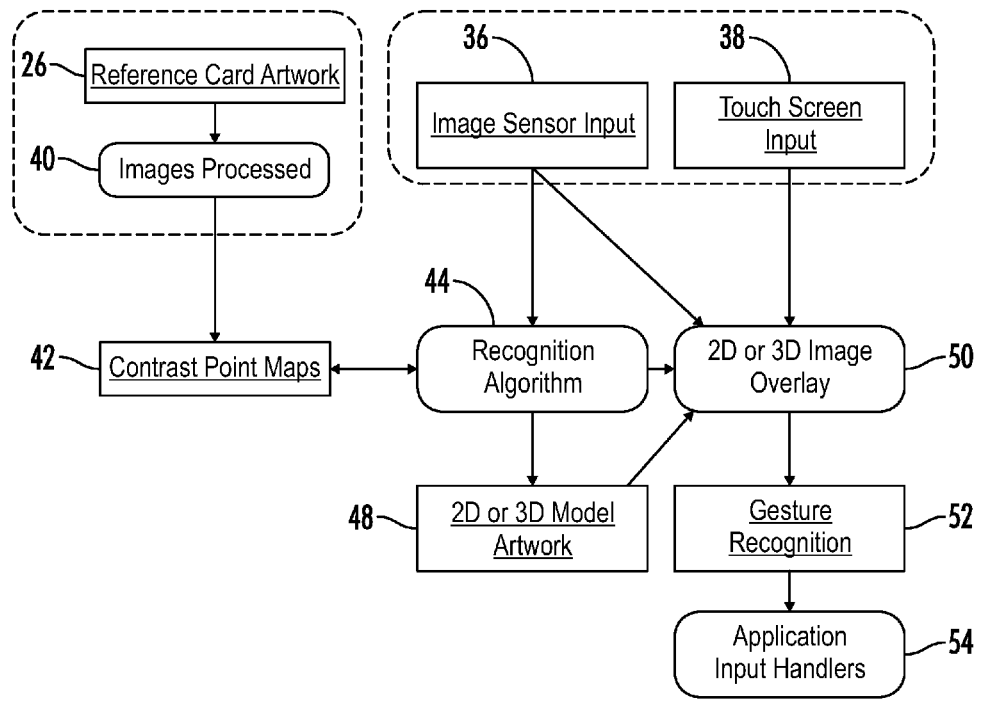
FIG. 2 is a block diagram representing exemplary program modules and system components for the system of FIG. 1.
Figure 3:
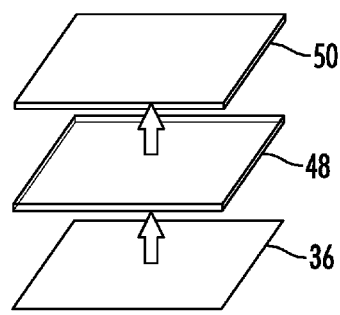
FIG. 3 is an isometric view representing a conceptual arrangement of overlaid image layers according to an embodiment of the present invention.
Figure 4:
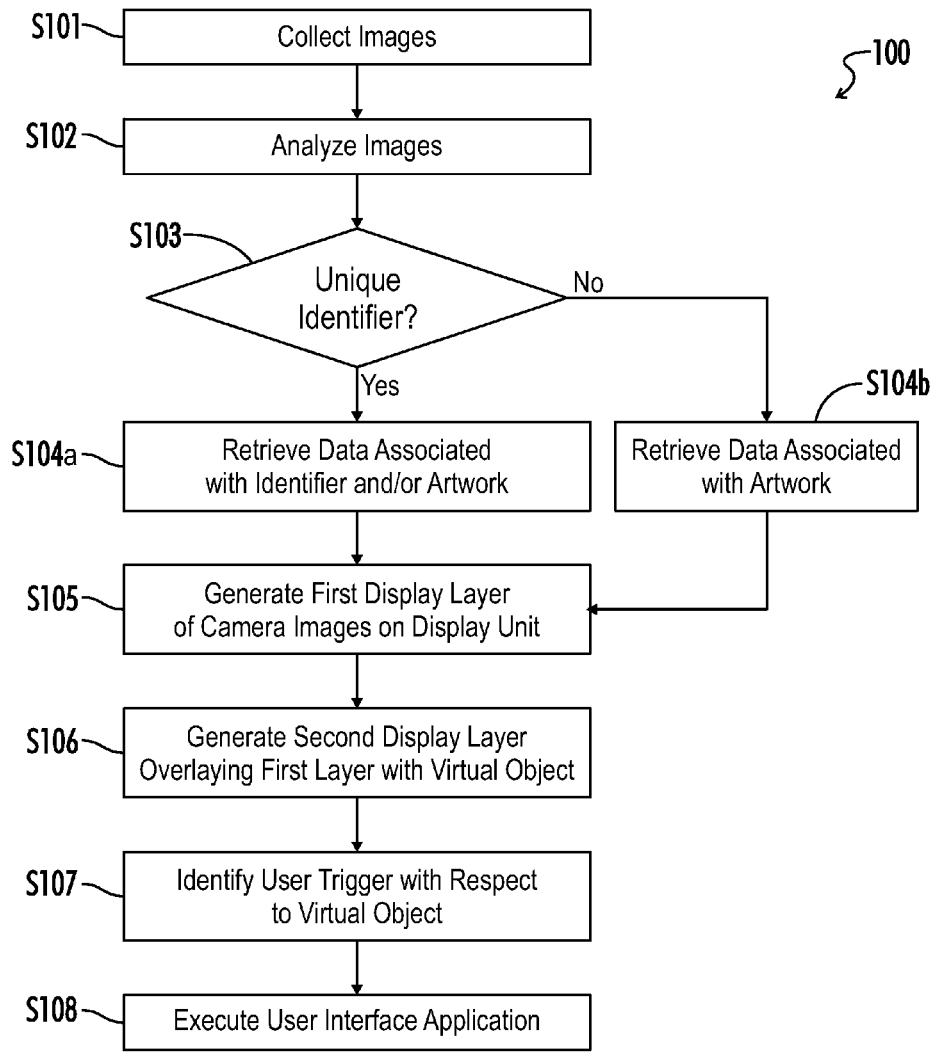
FIG. 4 is a flowchart representing an embodiment of a method of operation for an exemplary system according to the present invention.

Referring next to FIGS. 2-4 generally, exemplary embodiments of an augmented reality method 100 may now be described. Depending on the embodiment, certain acts, events, or functions of any of the algorithms described herein can be performed in a different sequence, can be added, merged, or left out all together (e.g., not all described acts or events are necessary for the practice of the algorithm). Moreover, in certain embodiments, acts or events can be performed concurrently, e.g., through multi-threaded processing, interrupt processing, or multiple processors or processor cores or on other parallel architectures, rather than sequentially.

In step S101, the process may begin with a user directing the image sensor for a computing device as described above toward a transaction card, and collecting still or streaming video images 36 which are displayed in real time on the display unit of the computing device. A touch screen input 38 may be provided to, e.g., enable capturing of individual images 36 or other video functions.

In step S102, the process continues by feeding the collected images 36 into a recognition algorithm 44. The recognition algorithm accesses contrast point map data 42 generated by electronically processing images 40 of reference card artwork 26 and comparing the collected images 36 to the contrast point map data 42. Certain computer vision techniques such as those associated for example with facial recognition technology may be utilized in implementation of this step, which may include identifying designs associated with a type of card (e.g., a standard design applied to all loyalty cards for a particular retailer) or designs associated with a particular card (e.g., an image such as a family photo provided by or on behalf of a particular user).

In certain embodiments as described above, particularly where facial recognition software may identify the type of card but not the unique account or user, the transaction card may include a unique identifier in addition to the artwork, in which case the process includes a step of reading the identifier (S103). After reading the identifier, data associated with the identifier and/or the artwork may be retrieved or otherwise obtained from local or remote data storage (S104a). If no unique identifier is provided, data associated with the artwork may still be retrieved or otherwise obtained (S104b). In one form, such retrieval of data may include extracting a predetermined 2D or 3D model design 48 for a virtual object associated with the transaction card. Such an object may be generally associated with all transaction cards of a particular type or design, or the particular object may be unique to the transaction card in question.

The process continues (S105, S106) when the images 36 (i.e., a first image layer) are overlaid with the 2D or 3D model artwork 48 (i.e., a second image layer) to generate a final presentation 50 as seen by the user via the display unit of the computing device. See FIG. 3 for an exploded graphical representation of the overlaid images. In certain embodiments, the second image layer may preferably be occlusive with respect to relevant portions of the first image layer, wherein the virtual object blocks out part of the underlying scene, which may typically for example be the card itself or may alternatively be a predetermined portion of the display unit regardless of where the device is pointed at that stage of the process. Steps S105 and S106 may as described above be performed as substantially the same step, but in various embodiments may be considered as separate steps within the scope of the present invention, depending on the program structure implemented.

In certain embodiments, the virtual object may be accompanied by the generation and delivery of specialized audio feedback to the user via appropriate audio output devices associated with the computing device. For example, the data files including information for generating the virtual object may be stored alongside audio files and further in association with for example metadata instructing the relevant program modules as to the relationship between the files and intended process for execution of the files where applicable.

In step S107, the process further includes identifying a user-initiated trigger with respect to the virtual object. In certain embodiments, this may include for example identifying user manipulation of the virtual object as a button or equivalent icon for the purpose of initiating further actions. Depending on the structure provided, the user may manipulate the object by engaging a portion of the display unit which includes the object, wherein a touch screen application identifies the user trigger and executes a user interface application or user application (S108). In a preferred embodiment, the user may manipulate the object by extending a finger or equivalent tool into the frame of the display and engaging the object in virtual space. A gesture recognition module 52 may be provided to identify the user trigger when a point device such as the user's finger, e.g., engages the same virtual space as is ostensibly occupied by the virtual object itself, and to execute the user interface application accordingly. As seen through the display unit, the pointing device, may in an embodiment be occlusive with respect to the virtual object (i.e., a third display layer).

In various embodiments, a user interface module may upon execution provide any number of functions related to a transaction card. In one example, a static three dimensional image may be generated as a popular collectible item and displayed over the transaction card like, e.g., a collectible figurine. This may in some cases desirably have the effect of driving collectors to purchase cards in order to complete a collection. Alternatively, the collectible item may be the original virtual object itself. In such embodiments, the user trigger step may be omitted, or alternatively identification of a user trigger may activate a program module which causes the object to perform dynamic functions, sing, change positions, etc.

In another example, particularly wherein a unique transaction card may be identified with respect to a card account and/or specific user account, certain card designs may be used to provide a card value, balance, notification of qualification for a reward, visual indication of a reward type, and many other account-specific pieces of information. In use, the card owner may implement a loyalty application on his/her device to view the transaction card, wherein the application would then place a two- or three-dimensional model that represents the specific reward in the space occupied by the card. For example, a giant floating dollar sign may be used to represent a cash reward. Where the application may effectively differentiate one card with the same artwork from another, for example via a unique identifier, the program modules of the present invention may be used for automatic registration of loyalty cards via a loyalty or rewards application, or with a wallet application or other equivalents.

Such user applications may take on numerous alternative forms. For example, in one embodiment wherein the transaction card is a transit card such as a MetroCard or the like, the user application may generate a transit schedule, a virtual map, customer assistance, etc.

In another exemplary embodiment, the user application may direct the user to a user interface such as a website linked to the card or a pop-up data entry module. The user application may alternatively upon execution retrieve and present media displays such as for example HTML files including text, audio files, video files, interactive games, etc.

In an embodiment, the applications may further coordinate with merchant applications and/or networks to dynamically generate virtual objects in association with specific transactions or events. For example, using a gift card to access a merchant internet store or other digital portal through which the device user can make purchases. For example, upon using a loyalty card or gift card in conjunction with a particular financial transaction, the associated merchant may offer a discount or other reward that is determinable by viewing the card via the image sensor and display unit and subsequently engaging a virtual object (e.g., a floating dollar sign, gift box, etc.) and revealing the reward.

In certain embodiments, the user interface application may generate a separate user interface such as for example a pop-up box, web page or the like wherein the user may perform activities related to the transaction card, e.g., modify account settings, make purchases, transfer funds, activate, or load the transaction card itself, perform identification or security measures, play an interactive game, view and send communications, etc.

The previous detailed description has been provided for the purposes of illustration and description. Thus, although there have been described particular embodiments of the present invention of a new and useful "method of transaction card recognition and interaction," it is not intended that such references be construed as limitations upon the scope of this invention except as set forth in the following claims.

What is claimed is:

1. A method for recognition of and interaction with a transaction card having a plurality of surfaces, at least one of the surfaces having a visual pattern applied thereto, the method comprising:
    collecting one or more real world images including the transaction card via an image sensor directed toward at least one of the surfaces having the visual patterns, the image sensor functionally linked to a computing device;
    displaying a first image layer comprising said one or more real world images on a display unit functionally linked to the computing device, said one or more images representing an orientation of the transaction card to the image sensor in three-dimensional space;
    electronically comparing the visual pattern in the collected one or more real world images with reference card patterns, wherein the visual pattern is identified as associated with a particular transaction card or type of transaction card;
    displaying a second image layer comprising a virtual object associated with the identified transaction card or type of transaction card on the display unit, wherein the virtual object is overlaid and occlusive with respect to at least a portion of the first image layer;
    upon identifying a dynamic trigger action by a user of the computing device with respect to the virtual object, executing an exchange of data associated with the transaction card between the client device and a remote server,
    wherein the dynamic trigger action comprises enabling a user to engage the virtual object with a pointer in the same three-dimensional space of the camera viewing area as the transaction card; and
    generating a third image layer associated with the pointer which is occlusive with respect to corresponding portions of the second image layer.

2. The method of claim 1, the virtual object comprising a graphical user interface generated on the display unit.

3. The method of claim 1, further comprising steps of:
    reading an identifier unique to the transaction card; and
    obtaining transaction card account data associated with the identifier.

4. The method of claim 3, wherein the step of executing an exchange of data associated with the transaction card between the computing device and a remote server comprises:
    generating a graphical user interface on the display unit, and
    enabling an exchange of account-specific data between the computing device and a remote server via user manipulation of the user interface.

5. The method of claim 4, the user interface effective to enable registration of an account associated with the transaction card via user manipulation of the user interface.

6. The method of claim 4, the user interface effective to enable purchases from a third party merchant via user manipulation of the user interface.

7. The method of claim 4, the user interface effective to enable transfer of funds between a transaction card user account and a third party account.

8. The method of claim 1, wherein the image sensor comprises a camera associated with a mobile computing device as the client device.

9. The method of claim 8, wherein the virtual object is displayed having an orientation in three-dimensional space corresponding to the orientation of the transaction card to the camera.

10. A system for recognition of and interaction with a transaction card having a plurality of surfaces, at least one of the surfaces having a visual pattern applied thereto, the system comprising:
a user computing device further comprising a camera, a display, a processor and a computer readable medium having one or more program modules residing thereon;
a server operatively linked to the processor of the user computing device via a communications network;
data storage comprising account data associated with each of a plurality of transaction cards, and reference data corresponding to a respective visual pattern provided upon at least one surface of each transaction card;
wherein the processor is configured to execute operations comprising:
upon direction of the camera toward a particular one of the plurality of transaction cards, displaying a real world image layer on the display including the particular transaction card, the image representing an orientation of the transaction card to the camera in three-dimensional space;
comparing the visual pattern in the displayed real world image with the reference data, wherein the visual pattern is identified as associated with the particular transaction card or an associated type of transaction card;
displaying a virtual image layer comprising a virtual object associated with the identified transaction card or type of transaction card on the display, wherein the virtual object is overlaid with respect to the real world image layer; and
upon identifying a dynamic trigger action by a user of the computing device with respect to the virtual object, executing an exchange of account data associated with the transaction card between the device and the server,
wherein the dynamic trigger action comprises enabling a user to engage the virtual object with a pointer in the same three-dimensional space of the camera viewing area as the transaction card; and
generating a third image layer associated with the pointer which is occlusive with respect to corresponding portions of the virtual image layer.

11. The system of claim 10, wherein the virtual object is displayed having an orientation in three-dimensional space corresponding to the orientation of the transaction card to the camera.

12. The system of claim 10, wherein at least part of the virtual image layer is occlusive with respect to corresponding portions of the real world image layer.

13. A system for recognition of and interaction with a transaction card having a plurality of surfaces, at least one of the surfaces having a visual pattern applied thereto, the system comprising:
a user computing device further comprising a camera, a display, a processor and a computer readable medium having one or more program modules residing thereon;
a server operatively linked to the processor of the user computing device via a communications network;
data storage comprising account data associated with each of a plurality of transaction cards, and reference data corresponding to a respective visual pattern provided upon at least one surface of each transaction card;
wherein the processor is configured to execute operations comprising:
upon direction of the camera toward a particular one of the plurality of transaction cards, displaying a real world image layer comprising an image on the display of the particular transaction card, the image representing an orientation of the transaction card to the camera in three-dimensional space;
comparing the visual pattern in the displayed image with the reference data, wherein the visual pattern is identified as associated with the particular transaction card or an associated type of transaction card;
displaying a virtual image layer comprising a virtual object associated with the identified transaction card or type of transaction card on the display, wherein the virtual object is overlaid with respect to the actual image layer, and at least part of the virtual image layer is occlusive with respect to corresponding portions of the actual image layer;
enabling a dynamic trigger action by a user of the computing device with respect to the virtual object, which dynamic trigger action enables an exchange of account data associated with the transaction card between the device and the server;
enabling a user to engage the virtual object with a pointer in the same three-dimensional space of the camera viewing area as the transaction card; and
generating a third image layer associated with the pointer which is occlusive with respect to corresponding portions of the virtual image layer.

14. The system of claim 13, wherein the dynamic trigger action comprises user manipulation of a portion of the display via a pointing device, the user manipulated portion of the display relating to the displayed virtual object.

15. The system of claim 14, wherein the exchange of data associated with the transaction card between the device and the server comprises:
generating a graphical user interface on the display unit, and
enabling an exchange of account-specific data between the computing device and a remote server via user manipulation of the user interface,
the exchange of account-specific data comprising one or more operations selectable by the user from among: registration of an account associated with the transaction card; purchases from a third party merchant; and transfer of funds between a transaction card user account and a third party account.

* * * * *